United States Patent [19]

Matsuyama et al.

[11] 4,043,639
[45] Aug. 23, 1977

[54] FIELD EFFECT TYPE LIQUID CRYSTAL DISPLAY ELEMENTS PROVIDED WITH POLARIZING PLATES

[75] Inventors: Sigeru Matsuyama; Hironari Tanaka; Masaharu Koyama; Tadashi Ishibashi, all of Mobara, Japan

[73] Assignee: Hitachi, Ltd., Tokyo, Japan

[21] Appl. No.: 699,867

[22] Filed: June 25, 1976

[30] Foreign Application Priority Data

July 7, 1975 Japan .................................. 50-82739

[51] Int. Cl.² .............................................. G02F 1/13
[52] U.S. Cl. .............................. 350/160 LC; 350/155
[58] Field of Search ................ 350/160 LC, 150, 154, 350/155

[56] References Cited

U.S. PATENT DOCUMENTS 3,869,196   3/1975   Kubota .......................... 350/160 LC

OTHER PUBLICATIONS

"Liquid Crystals: Those New Electronic Showoffs", Popular Science, Feb., 1972, pp. 78, 79, 146.

*Primary Examiner*—Edward S. Bauer
*Attorney, Agent, or Firm*—Charles E. Pfund

[57] ABSTRACT

A field effect type liquid crystal display element is provided with polarizing plates. Each polarizing plate comprises a polarizing film consisting of polyvinyl chloride and supporting members bonded to both sides of the polarizing film and an ultraviolet ray absorbing agent is incorporated to either one of the polarizing film and the supporting members.

4 Claims, 2 Drawing Figures

FIELD EFFECT TYPE LIQUID CRYSTAL DISPLAY ELEMENTS PROVIDED WITH POLARIZING PLATES

BACKGROUND OF THE INVENTION

This invention relates to a liquid crystal display element provided with polarizing plates, and more particularly to a field effect type liquid crystal display element.

A liquid crystal display element generally comprises two opposed substrates coated with electrodes and a liquid crystal substance filling the space between the electrodes, and the optical characteristic of the liquid crystal is changed by applying voltage across the electrodes thereby displaying a desired pattern. Such liquid crystal display element has a member of advantageous features that the thickness of the element is small, that the pattern to be displayed can be freely selected, that the power consumption is small, and that the element can be operated at a low operating voltage so that it is possible to directly drive the element by a C-MOS integrated circuit. For this reason, in recent years liquid crystal display elements are abundantly used in wrist watches, table type electronic computers, metering instruments or the like.

Among various types of the liquid crystal display element, a field effect type display element, to which the invention relates, generally comprises polarizing plates mounted on the outer side of two opposed substrates. More particularly, the polarizing plate utilized in this type of the liquid crystal display element generally consists of an organic substance. For example, iodine is adsorbed by a film of polyvinyl alcohol and then the film is elongated in a definite direction to arrange the crystals of the polyvinyl alcohol in a definite direction. The elongated film is then bonded to one side of a cellulose film which acts as a substrate.

However, polyvinyl alcohol is a polymer soluble in water so that it readily dissolves in water in an environment at a high temperature and high humidity thus losing its ability as a polarizing plate. Even immersed in water at room temperature the polarizing ability of a polyvinyl alcohol film degrades greatly in only several hours. For this reason, when liquid crystal display elements incorporated with polarizing plates having such characteristics are used as the display elements of wrist watches, table type electronic computer, metering instruments or the like there occur many problems as follows. These devices are used under various environments including high temperature and high humidity, even under water, which are detrimental to the desired characteristics of the polarizing plate. When used under such adverse environments, the polarizing capability of the polarizing plate is degraded or completely lost, thus rendering inoperative the display element. Such display elements of degraded quality must be discarded.

Considering the field effect type one from different view point, the liquid crystal of the schiff chloride basic or azoxy type loses its liquid crystal property when it is irradiated with ultraviolet rays for a long time. The solar light arriving at the ground surface contains light components having a wavelength longer than 290 nμ. For this reason, it was found that schiff chloride basic type liquid crystal loses its liquid crystal property when it is subjected to light components having a wavelength of less than 400 nμ for an interval of ½ year to 1 year.

In the same manner, the prior art polyvinyl alcohol film used as the polarizing plate degrades its property due to ultraviolet rays, so that this plate is not satisfactory.

SUMMARY OF THE INVENTION

Accordingly, it is the principal object of this invention to provide an improved field effect type display element provided with polarizing plates capable of satisfactorily displaying an information and operating for a long time.

Another object of this invention is to provide a liquid crystal display element provided with polarizing plates capable of withstanding high temperature, high humidity and ultraviolet rays.

According to this invention these and other objects can be accomplished by providing a field effect type liquid crystal display element of the type wherein a field effect type liquid crystal is interposed between a pair of spaced substrates provided electrodes and polarizing plates are disposed on the outside of the substrates, wherein each polarizing plate comprises a polarizing film consisting essentially of polyvinyl chloride and supporting members bonded to the opposite sides of the polarizing film by a bonding agent and the polarizing plates contain an ultraviolet ray absorbing agent. The ultraviolet ray absorbing agent may be incorporated into either one of the supporting member, the bonding agent and the polarizing film.

DESCRIPTION OF THE PREFERRED EMBODIMENTS

Figure 1:
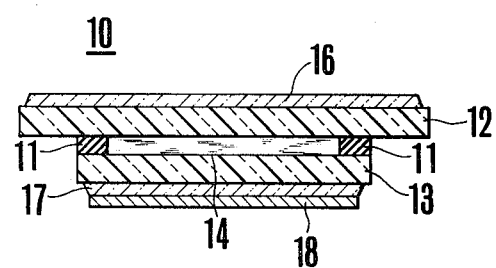
FIG. 1 is a longitudinal sectional view showing one embodiment of the liquid crystal display element embodying the invention and FIG. 2 is a longitudinal sectional view showing the detail of one polarizing plate.

A liquid crystal display element 10 shown in FIG. 1 comprises parallel first and second substrates 12 and 13 which are maintained at a desired spacing, 5 to several tens microns for example, by a sealing member 11 and a spacer made of glass fibers or glass particles. Although not shown, the inner surfaces of the substrates are covered by electrode layers. The sealing member 11 and the spacer are sealed to substrates 12 and 13 by means of a sealing agent such as frit glass. If desired, the spacer may be made of a sealing agent. A liquid crystal 14 fills the space defined by the substrates and the spacer. In a liquid cyrstal display element of the twisted nematic type, the surfaces of the substrates 12 and 13 contacting the liquid crystal 14 are provided with well known means for aligning the molecules of the liquid crystal in a desired definite direction. By selecting different directions of alignment for the first and second substrates the arrangement of the nematic molecules of the liquid crystal 14 becomes twisted between the opposed substrates, that is from a first direction on one substrate to a second direction on the other. The liquid crystal may be schiff chloride basic type, azoxy type, ester type or biphenyl type. The angle between the first and second directions may be any value but about 90° is generally used.

Polarizing plates 16 and 17 are applied to the outside of the substrates 12 and 13. Usually the polarizing axis of the first polarizing plate 16 is coincided with the first direction of the first substrate 12 whereas the polarizing axis of the second polarizing plate 17 is coincided with the second direction of the second substrate 13. In this case, where the angle of twist of the liquid crystal molecules is equal to 90° the polarizing axes of the first and second polarizing plates 16 and 17 cross each other at an angle of 90°. Where the display element 10 is desired to be reflective a reflective plate 18 is disposed on the outside of the lower polarizing plate 17.

When a voltage of several to several tens volts is impressed across the liquid crystal display element constructed as above described the liquid crystal molecules originally arranged helically are rearranged in the direction of the applied electric field. As a consequence, incident light transmitting through the polarizing plate cannot transmit through the second polarizing plate, thus intercepted. When no voltage is applied across the electrodes, the light transmitting through the polarizing plate 16 is rotated 90° by the helical arrangement of the liquid crystal molecules and then transmits through the polarizing plate 17 to arrive at the reflecting plate 18. The light is reflected by the reflecting plate 18 and passes in the opposite direction to the outside of the display element. The display element utilizes such transmission and reflection of the light to display a digit, design or other desired pattern.

In the display element described above when the polarizing axis of the second polarizing plate 17 is made parallel with the polarizing axis of the first polarizing plate 16, the light is intercepted when voltage is not impressed across the electrodes whereas the light is permitted to transmit through the display element when voltage is impressed across the electrodes.

Figure 2:
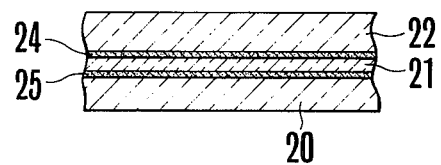

The polarizing plates 16 and 17 embodying the invention and utilized in a liquid crystal display element in a manner described above has a construction as shown in FIG. 2. Thus each polarizing plate comprises a polarizing film 21 utilizing polyvinyl chloride as the base material. The polarizing film 21 may be prepared by chemically combining dien type dyestaff with the molecular chain of polyvinyl chloride and then elongating the film for arranging the molecules in one direction. Supporting members 22 and 23 each composed with cellulose triacetate incorporated with an ultraviolet ray absorbing agent are bonded to the opposite surfaces of the polarizing film 21 by film of bonding agent 24 and 25. As the ultraviolet ray absorbing agent incorporated into the supporting members 22 and 23 may be used esters of salicylic acid, hydroxybenzophenone, its derivative benzotriazole and its derivative. In addition to the materials described above, any transparent material free from optical anistropy such as polycarbonates, celluloses and crylic resins may be used as the supporting members.

Polarizing plates 16 and 17 having a construction just described can greatly improve the high temperture resistant property and the humidity resistant property when compared with the prior art polyvinyl alcohol films. Moreover, it is possible to increase the life by a factor of 100 or more. Since an ultraviolet absorbing agent is added to the polarizing plate it is possible to prevent degradation of the liquid crystal by ultraviolet rays thereby providing an efficient field effect type liquid crystal display element capable of preserving the desired characteristics of the liquid crystal over a long period by preventing deterioration of the liquid crystal by ultraviolet rays.

Although in the foregoing embodiment an ultraviolet ray absorbing agent was added to the supporting members 22 and 28, such agent can also be added to the bonding agent for bonding the polarizing film to the supporting members. With the latter construction it is also possible to efficiently protect the polarizing film 21 and the liquid crystal 14 against the adverse effect of ultraviolet rays. It is extremely easy to add the ultraviolet ray absorbing agent to the bonding agent thus improving productivity than the first embodiment.

The ultraviolet ray absorbing agent can also be added to the polarizing film 21.

While the invention has been shown and described in terms of preferred embodiments, it should be understood that the invention is not limited to these specific embodiments and that various modifications may be made without departing from the spirit of the invention.

What is claimed is:

1. In a field effect type liquid crystal display element of the type wherein a field effect type liquid crystal is interposed between a pair of spaced substrates provided with electrodes and polarizing plates are disposed on the outside of respective substrates, the improvement wherein each one of said polarizing plates comprises a polarizing film consisting essentially of polyvinyl chloride and supporting members bonded to the opposite sides of said polarizing film by a bonding agent, said polarizing plates containing an ultraviolet ray absorbing agent.

2. The field effect liquid crystal display element according to claim 1 wherein said ultraviolet ray absorbing agent is incorporated into said supporting members.

3. The field effect liquid crystal display element according to claim 1 wherein said ultraviolet ray absorbing agent is incorporated into said bonding agent.

4. The field effect type liquid crystal display element according to claim 1 wherein said ultraviolet ray absorbing agent is incorporated into said polarizing film.